Aug. 15, 1933.   J. SCHICK   1,922,824
ELECTRIC MOTOR
Filed Aug. 19, 1930
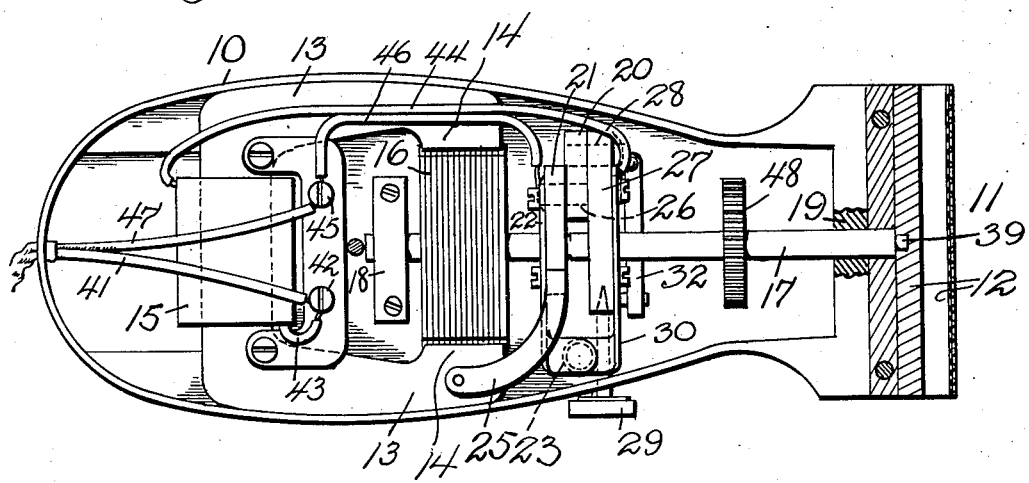
Fig. 1
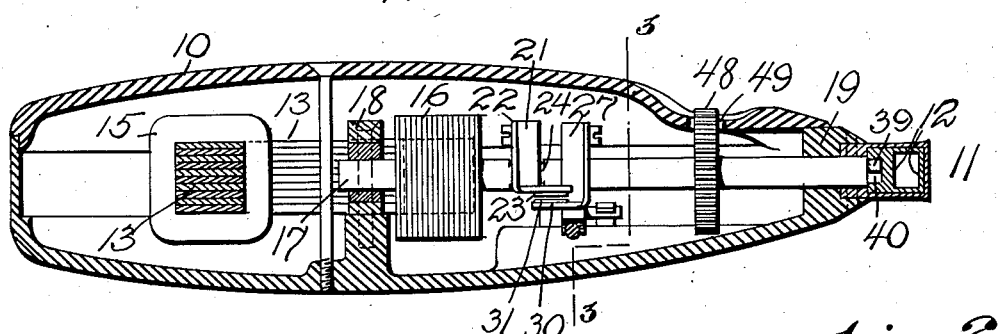
Fig. 2
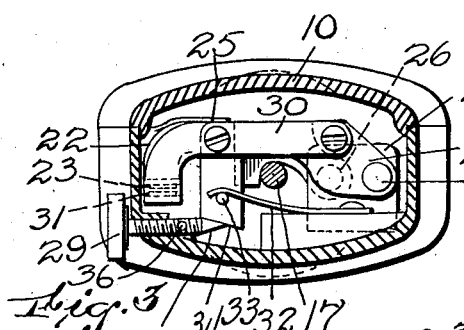
Fig. 3
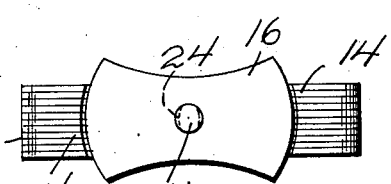
Fig. 5
Fig. 4
INVENTOR
Jacob Schick
BY
Wm H Caulfield
ATTORNEY Patented Aug. 15, 1933

1,922,824

UNITED STATES PATENT OFFICE 1,922,824

ELECTRIC MOTOR

Jacob Schick, Sound Beach, Conn., assignor to Schick Dry Shaver, Inc., Stamford, Conn., a Corporation of Delaware Application August 19, 1930. Serial No. 476,303

5 Claims. (Cl. 172—36)

This invention relates to an improved electric motor of the magnetic type. The motor is adapted for any use but it is particularly adapted for use as a miniature motor. It is designed to be used in the handles of hand tools such as, shaving machines, hair clippers, vibrators, dentists' tools, and various other articles requiring such a motor.

The object of the invention is to provide a motor requiring but little current to operate it whether that current be alternating or direct current; to provide a motor that does not heat up when running and if inadvertently left idle will do no damage; one that has but little vibration and is nearly noiseless; and one that can be started and stopped by direct contact with the armature shaft, thus eliminating a switch. The invention is also designed to operate at a relatively slow speed for a miniature motor thus eliminating the necessity of gearing for reduction of speed.

The motor is illustrated in the accompanying drawing in which it is shown as applied to a shaving machine such as described in my Patent No. 1,721,530 issued July 23, 1929.

In the drawing, Figure 1 is a top view of a motor of the improved construction as installed in a shaving machine. Figure 2 is a longitudinal section of Figure 1. Figure 3 is section on line 3—3 in Figure 2. Figure 4 is a detailed view of a screw adjustment used in the motor. Figure 5 is a front view of the shaft, armature and field of the motor.

The motor is shown enclosed in a handle 10 with the shaving head 11 at one end and this head includes a laterally reciprocating cutter 12 which is operated by the motor shaft.

The motor comprises a field magnet 13 which is made with an open end providing opposed poles 14. The field magnet is approximately U-shaped and the cross arm or reach is provided with the coil 15.

The armature 16 is not wound and is arranged within the field magnet and between the ends or poles of the field magnet. The armature has two opposite ends convex and the opposite sides concave. The armature, due to this outline, is defined in this specification as of hour glass shape. The armature is made up of laminated sheets. The armature rotates in a plane perpendicular to the plane of the field magnet. The armature is supported on a shaft 17 which is rotatable in a bearing 18 and in the bearing 19 at the end of the handle. The arrangement and location of the armature are advantageous because they provide adequate power. The magnetic force acts on the armature from the poles only and there is no retarding influence from the field magnet as is present when the armature rotates in the plane of the field magnet, and particularly when it is centrally arranged.

The make-and-break device for controlling the passage of current to the coil consists of two contacts mounted on arms. One is relatively fixed as it moves only when adjusted while the other one is moved into and out of contact with the fixed one. The two contacts are mounted for convenience and economy on a stud 20. One comprises an arm 21 carrying the contact strip 22 on the end of which is the point or contact 23. The arm 21 rests on the shaft 17 which is cut away as shown in dotted lines in Figure 5, at 24. This provides the required cam action to raise the arm 21 which is normally pressed toward the shaft by the spring 25. The arm 21 is pivoted to the stud 20 at 26.

The fixed arm 27 is pivoted to the stud 20 at 28 and extends over the shaft and is supported at its free end by the screw 29 or other suitable adjusting means. The arm 27 carries the strip 30 which has its end supplied with the point 31 opposite the point 23. The arm 27 is normally held in place by the spring 32 resting on the pin 33 of the arm. The arm has its free end inclined as at 34 and the end 35 of the screw 29 is tapered and bears under the tapered or inclined face 34 and the distance separating the points or contacts is regulated. This controls the speed of the motor by making contact at predetermined positions of the armature. To prevent the excess movement of the screw 29 as the regulation requires but little movement I arrange a stop 36 in the screw. This stop can be in the form of a bent wire which has its end 37 engaging the face 38 of part of the handle when at one limit of movement and with its rounded part engaging the said face at the other limit of movement. The amount of bending provides a quick and easy way of determining the limits of rotation of the screw 29. The screw 29 is preferably extended to the outside of the handle to make it accessible for ready use.

The end of the shaft 17 has a pin 39 mounted eccentrically thereon and working in a slot 40 in the cutter 12 to reciprocate the cutter 12. The pin 39 is placed so that the contacts engage as the cutter begins its recoprocating or cutting stroke.

The wiring is conventional. The main wire 41 passing to the coil through post 42 and wire 43 and the wire 44 extends from the coil to the contact 30. The other contact 22 is connected to the post 45 by wire 46 and thus to the other main wire 47.

The shaft has a wheel 48 or its equivalent secured thereto and it projects through the slot 49 in the handle so that enough of the wheel projects to allow it to be started by a sweep of the thumb and to be stopped by pressure of the finger. The wheel 48 is the sole means in the motor for starting or stopping the motor.

The field magnet 13 is made of metal with a low permeability and soft iron is found an excellent material. The metal has a high magnetic retentivity or coercive force and retains enough magnetism to pull the armature to a position shown in Figure 5 or approximately this position. The armature can be said to bridge the space between the poles. When the armature is in this position the high point of cam 24 lifts the contact 22 clear of the other contact and the current is shut off from the coil. In this way the stopping wheel 48 will allow the residual magnetism to pull the armature to what might be termed its normal position in which position the contacts are separated.

When the starting wheel is spun by the thumb or finger it sets up enough motion to enable the momentum of the armature to carry it past the normal position and the operation of the motor is started.

This motor operates on both alternating and direct current.

Various changes can be made in the arrangement and location of the parts without departing from the scope of the invention.

I claim:—

1. A motor comprising a field member having spaced ends, an armature having aligned projecting arms and concave sides and rotatable between said ends in a plane perpendicular to the plane of the field member; contacts, one of which is operated from the armature and regulated to be in open position when the said arms are approximately extending between said ends, a shaft on which the armature is secured, and a wheel on said shaft for starting and stopping the motor said field member having high magnetic retentivity to hold said armature in place during the stopping operation.

2. An electrically operated hand tool including a handle, an electric motor in the handle, a make-and-break device operated by the motor, and disposed to be open when the armature bridges the field magnet of the motor, the motor having its field magnet made of metal having a low magnetic permeability with high retentivity whereby the armature is influenced to assume a position bridging the field magnet when the motor is stopped.

3. A motor comprising a field magnet and an armature of hour glass form in which the field is made of metal of low magnetic permeability with high retentivity, and a make-and-break device operated from the armature and disposed to be open when the armature bridges the poles of the field magnet.

4. A motor comprising a field magnet with an open end having the poles spaced at said end, an armature between the poles and rotatable in a plane perpendicular to the plane of the field magnet, a make-and-break device including a movable contact arm bearing on the shaft and oscillated thereby, a wheel on the shaft for starting and stopping the motor, and a screw for adjusting the other contact arm of the make-and-break device.

5. A motor comprising a field member having spaced ends, an armature having aligned projecting arms and concave sides and rotatable between said ends in a plane perpendicular to the plane of the field member; contacts, one of which is operated from the armature and regulated to be in open position when the said arms are approximately extending between said ends, a shaft on which the armature is secured, said field member having high magnetic retentivity to hold said armature in place during the stopping operation.

JACOB SCHICK.